United States Patent
Kim et al.

(10) Patent No.: US 10,290,852 B2
(45) Date of Patent: May 14, 2019

(54) BATTERY PACK INCLUDING AN INTERLOCK SWITCH

(71) Applicants: SAMSUNG SDI CO., LTD., Yongin-si, Gyeonggi-do (KR); Robert Bosch GmbH, Stuttgart (DE)

(72) Inventors: Myung-Chul Kim, Yongin-si (KR); Hee-Joon Jin, Yongin-si (KR); Jang-Gun Ahn, Yongin-si (KR); Young-Bin Lim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 1073 days.

(21) Appl. No.: 13/743,583

(22) Filed: Jan. 17, 2013

(65) Prior Publication Data

US 2013/0288086 A1    Oct. 31, 2013

(30) Foreign Application Priority Data

Apr. 27, 2012    (KR) .......................... 10-2012-0044229

(51) Int. Cl.
*H01H 9/10*    (2006.01)
*H01M 2/02*    (2006.01)
(Continued)

(52) U.S. Cl.
CPC ........... *H01M 2/34* (2013.01); *H01M 2/1077* (2013.01); *H01M 2/1083* (2013.01); *H01M 2200/00* (2013.01); *H01M 2220/20* (2013.01)

(58) Field of Classification Search
None
See application file for complete search history.

(56) References Cited

U.S. PATENT DOCUMENTS 3,937,636 A * 2/1976 Slautterback ..................... 429/7
4,305,610 A * 12/1981 Piteo, Jr. ................... H02B 1/14
                                                                   200/50.07

(Continued)

FOREIGN PATENT DOCUMENTS

| JP | 2011-165477 A | 8/2011 |
| KR | 10-2002-0044684 A | 6/2002 |
| KR | 10-2011-0061057 A | 6/2011 |

OTHER PUBLICATIONS

Korean Office action dated Feb. 1, 2016 for KR 10-2012-0044229; Myung-Chul Kim, et al.

*Primary Examiner* — Ula C Ruddock
*Assistant Examiner* — Anna Korovina
(74) *Attorney, Agent, or Firm* — Lee & Morse, P.C.

(57) ABSTRACT

A battery pack includes a housing having an opened top and the housing accommodates at least one battery module and a fuse therein, a housing cover that covers the opened top of the housing and the housing cover includes an opening therein that corresponds to a region of the housing that accommodates the fuse, and an opening cover mountable to the opening of the housing cover and a state of the opening cover is changeable between an opened state and a closed state. The opening cover includes an interlock switch on an inner surface of the opening cover and a grip portion on an outer surface of the opening cover, and the grip portion is arranged along a vertical direction with respect to the interlock switch.

12 Claims, 3 Drawing Sheets

(51) Int. Cl.
    *H01M 2/04*     (2006.01)
    *H01M 10/42*     (2006.01)
    *H01M 2/34*     (2006.01)
    *H01M 2/10*     (2006.01)

(56) References Cited

U.S. PATENT DOCUMENTS

| | | | |
|---|---|---|---|
| 5,406,449 A * | 4/1995 | Hicks et al. | 361/616 |
| 6,030,257 A * | 2/2000 | Furuya | 439/620.26 |
| 6,407,656 B1 * | 6/2002 | Konda | H01H 1/365 |
| | | | 337/186 |
| 2005/0093371 A1 * | 5/2005 | Zdziech | H01H 83/20 |
| | | | 307/10.1 |
| 2011/0127154 A1 | 6/2011 | Oh et al. | |
| 2012/0150375 A1 * | 6/2012 | Adachi | H01M 2/34 |
| | | | 701/22 |

* cited by examiner

BATTERY PACK INCLUDING AN INTERLOCK SWITCH

CROSS-REFERENCE TO RELATED APPLICATION

This application claims priority under 35 U.S.C. § 119 to Korean Patent Application No. 10-2012-0044229, filed on Apr. 27, 2012, in the Korean Intellectual Property Office, the entire content of which is incorporated herein by reference.

BACKGROUND

Battery cells may be used as energy sources for mobile devices, electric vehicles, hybrid vehicles, and the like. The shape of the battery cell may be variously changed depending on the kind of external device to which the battery cell is applied.

A small-sized mobile device such as a cellular phone may be operated with the power and capacity of a single battery cell for a certain period of time. In contrast, to increase power and capacity, a large capacity battery module having longer driving times, higher driving power, and/or larger power production capabilities may be used for an electric vehicle, hybrid vehicle, and the like, which has large power consumption. The battery module increases output voltage or current according the number of battery cells built therein. A battery pack may be configured by electrically connecting a plurality of battery modules.

SUMMARY

Embodiments may be realized by providing a battery pack that includes a housing having an opened top and the housing accommodates at least one battery module and a fuse therein, a housing cover that covers the opened top of the housing and the housing cover includes an opening therein that corresponds to a region of the housing that accommodates the fuse, and an opening cover mountable to the opening of the housing cover and a state of the opening cover is changeable between an opened state and a closed state. The opening cover includes an interlock switch on an inner surface of the opening cover and a grip portion on an outer surface of the opening cover, and the grip portion is arranged along a vertical direction with respect to the interlock switch.

The interlock switch may be configured to cut off a current flowing in the fuse according to the state of the opening cover. The interlock switch may be configured to cut off a current flowing in the fuse when the opening cover is in the opened state. The interlock switch may be configured to restore the current flowing in the fuse when the state of the opening cover changes from the opened state to the closed state.

The interlock switch may have at least one connection pin. At least one connection terminal may be connected to the fuse and the connection terminal may correspond to the connection pin. When the opening cover is in the opened state, the connection terminal may be separated from the connection pin. When the opening cover is in the closed state, the connection terminal may be connected to the connection pin. The interlock switch may include a body portion that surrounds sides of the connection pin at a predetermined distance from the connection pin.

When the opening cover is in the closed state, the connection terminal may be connected to the connection pin in an internal space of the body portion of the interlock switch. The body portion may be formed of an insulating material. The grip portion may be vertically aligned with the body portion of the interlock switch.

The housing cover may include a mounting portion extending along a perimeter of the opening. The mounting portion may have the opening cover mounted thereon. The mounting portion of the housing cover may include a first hole extending therethrough. The opening cover may include a second hole corresponding to the first hole extending therethrough. The first and second holes may be fastened by a fastening member.

The opening cover may be seated directly on the mounting portion. When the opening cover is in the opened state, the fuse in the housing may be exposed and electrically isolated from a power supply. The interlock switch may be configured to electrically isolate the fuse from the power supply simultaneously with changing the state of the opening cover from the closed state to the opened state.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
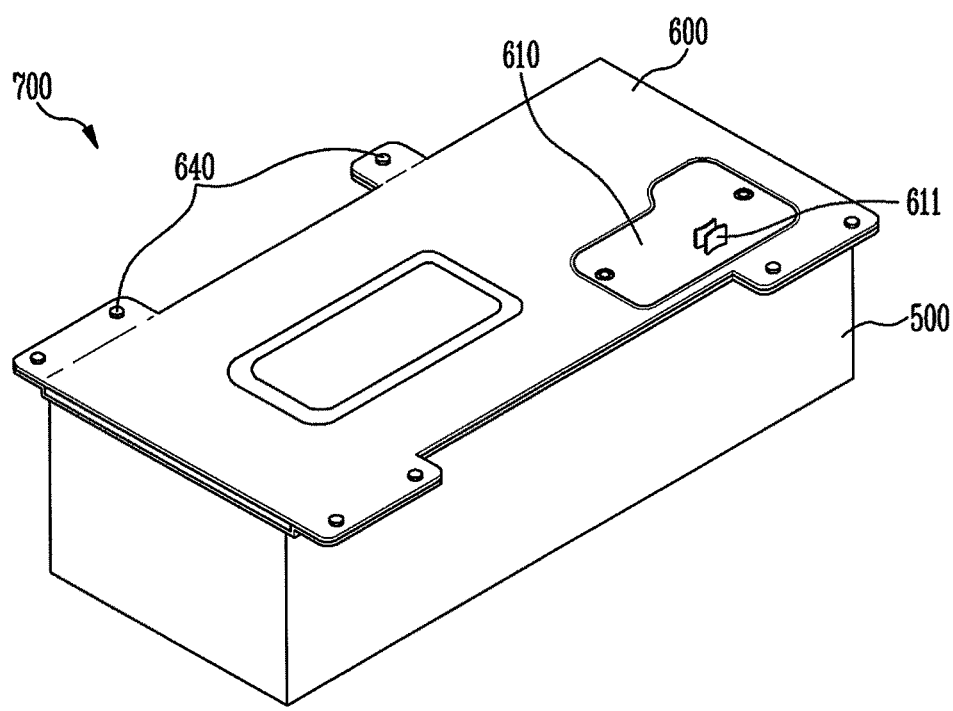
FIG. 1 illustrates a perspective view of a battery pack according to an exemplary embodiment.

Korean Patent Application No. 10-2012-0044229, filed on Apr. 27, 2012, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Hereinafter, like reference numerals refer to like elements. The drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

FIG. 1 is a perspective view showing a battery pack according to an exemplary embodiment.

Referring to FIG. 1, the battery pack 700 may include a housing 500 and a housing cover 600 covering an opened top of the housing 500. The housing cover 600 may be fixed to the housing 500, e.g., through a structure that includes fastening members 640. The housing cover 600 may include an opening cover 610 formed in a partial area thereof, e.g., formed in one corner of the housing cover 600. The housing 500 has the opened top so that a plurality of battery modules, a fuse, and the like may be accommodated in the inside of the housing 500. The housing cover 600 covers the opened top of the housing 500, a portion of which opened top corresponds to an opening 520 (see FIG. 2) that is formed in a region corresponding to a fuse 400 accommodated in the inside of the housing 500.

The opening cover 610 is mounted in the opening 520 so as to be changeable between opened, e.g., in an opened state so as to expose the opening 520, and closed, e.g., in a closed state so that the opening 520 is covered. When the opening cover 610 is in the opened state, the opening cover 610 may be only partially or entirely separated from the housing cover 600. Components such as the fuse 400 may be mounted below the opening cover 610 and within the housing 500. The opening cover 610 may be mounted in such a configuration so as to facilitate a repair operation. For example, the opening cover 610 may be mounted so that an operation of replacing the fuse 400 or the like in the battery pack 700 may be performed through the opening 520.

An interlock switch 616 (see FIG. 2) may be formed on the inner surface of the opening cover 610. The interlock switch 616 may be connected to a connection terminal 410 (see FIG. 2) that is arranged in the inside of the housing 500. The interlock switch 616 may be configured to selectively connect and disconnect power of the battery pack 700 according to a connection state of the interlock switch 616. The connection state of the interlock switch 616 may be based on whether the opening cover 610 is in the opened state or the closed state.

A grip portion 611 may be formed on the outer surface of the opening cover 610 so as to facilitate changing of the state of the opening cover 610, e.g., so as to facilitate removing and mounting of the opening cover 610. For example, the grip portion 611 may be formed on the outer surface of the opening cover 610 so as to be arranged along a vertical direction and/or aligned, e.g., vertically aligned, with the interlock switch 616 formed on the inner surface of the opening cover 610. The interlock switch 616 may function to cut off current flowing in the fuse according to the opening cover 610 being in the opened state.

A mounting portion 630 having the opening cover 610 mounted thereon may be formed along a perimeter, e.g., an entirety of the perimeter, of the opening 520 in the housing cover 600. The mounting portion 630 may be integrally formed with the housing cover 600. The mounting portion 630 may include a portion that is sloped toward the inside of the housing 500. In another exemplary embodiment, the mounting portion 630 may form a stepped structure, and the opening cover 610 may be seated on a portion of the stepped structure. A shape of the opening cover 610 may correspond to the opening 520. Further, a size of the opening cover 610 may be slightly larger than the opening 520 so that the opening cover 610 may be mounted on, e.g., directly seated on, the mounting portion 630 that surrounds the opening 520.

Accordingly, the opening cover 610 may be mounted on the mounting portion 630 and then fixed to the housing cover 600. For example, a first hole 510 (see FIG. 3) may be formed in the mounting portion 630 of the housing cover 600, and a second hole 613 corresponding to the first hole 510 may be formed in the opening cover 610 (see FIG. 2). Thus, the first and second holes 510 and 613 may be used to fasten the opening cover 610 to the mounting portion 630 by a fastening member 612 that extends through both the first and second holes 510 and 613.

Through the fastening structure of the housing cover 600 and the opening cover 610, the opening cover 610 may be easily opened and closed when repair of components within the housing 500 (such as the fuse 400) is sought. When the opening cover 610 is opened, the power of the battery pack 700 may be disconnected, e.g., simultaneously disconnected, so that when various types of components in the battery pack 700 are replaced, the components may be easily and safely replaced. For example, because the power of the battery pack 700 is disconnected, components may be replaced while reducing the possibility of an accidental electrical shock.

The grip portion 611 formed on the outer surface of the opening cover 610 may be positioned vertical to the interlock switch 616 formed on the inner surface of the opening cover 610, so that when the opening cover 610 is opened/closed, the interlock switch 616 may be exactly separated/fastened by using the grip portion 611. For example, when the opening cover 610 is opened by using the grip portion 611, the interlock switch 616 may be simultaneously disconnected from a connection terminal 410 within the housing 500. Further, when the opening cover 610 is remounted on the housing cover 600 so as to be in the closed state, the interlock switch 616 may be simultaneously reconnected to the connection terminal 410. Accordingly, it may be possible to reduce the possibility of and/or prevent damage of the interlock switch 616 and to easily fasten the interlock switch 616 using the grip portion 611 at an exact position with respect to the connection terminal 410.

Figure 2:
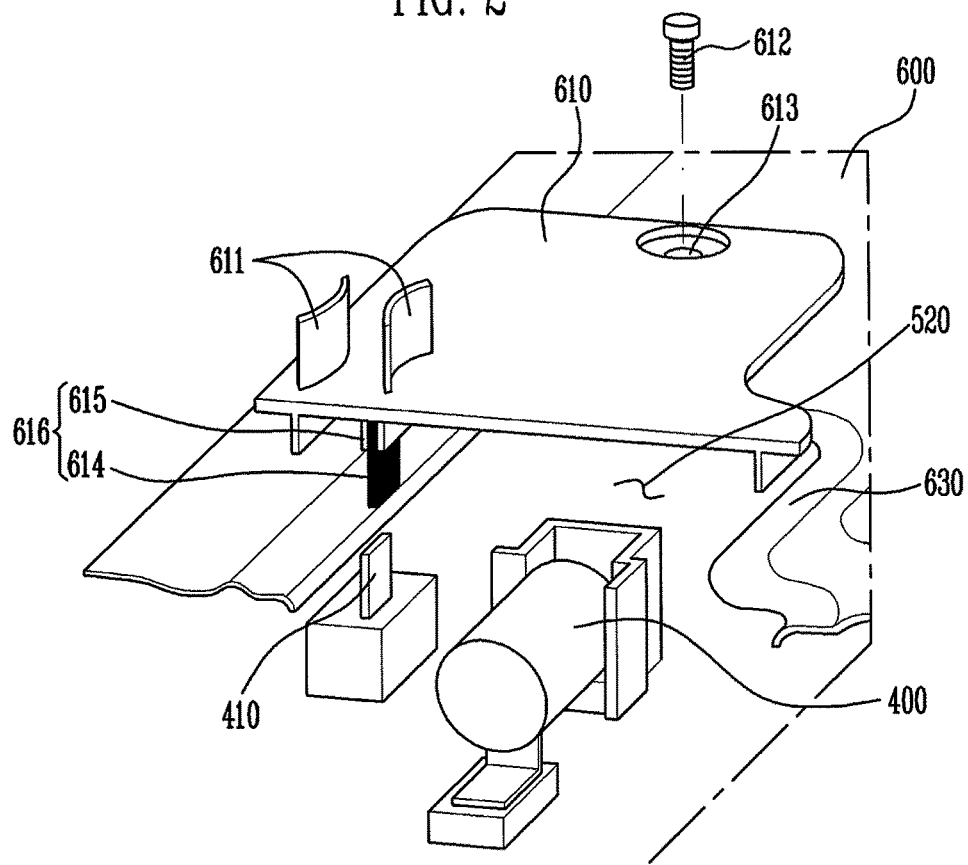
FIG. 2 illustrates a perspective view of a state in which an opening cover is opened from a housing cover according to an exemplary embodiment.

FIG. 2 is a perspective view showing a state in which the opening cover 610 is opened, e.g., dismounted from, the housing cover 600 according to an exemplary embodiment.

Referring to FIG. 2, when the opening cover 610 of the battery pack 700 is opened from the housing cover 600, the underlying fuse 400 may be exposed through the opening 520. In this case, the first hole 510 (see FIG. 3) in the mounting portion 630 of the housing cover 600 may be separated from the fastening member 612 fastened to the opening cover 610, and the opening cover 610 is opened from the housing cover 600. In such a configuration, when the opening cover 610 is opened, components within the housing 500 (such as the fuse 400 that is positioned in the housing 500 below the opening cover 610) may be replaced.

The interlock switch 616 may be formed on the inner surface of the opening cover 610 so as to cut off current flowing in the fuse 400 when the opening cover 610 is opened. The interlock switch 616 may include a least one connection pin 614 and a body portion 615 surrounding the sides of the connection pin 614 at a predetermined interval from the connection pin 614. For example, the connection pin 614 may be seated within the body portion 615. The body portion 615 may be formed of an insulative material so as to be an insulating member.

At least one connection terminal 410 corresponding to the connection pin 614 may be connected to the fuse 400. As shown in FIG. 2, the connection pin 614 may be separated from the connection terminal 410 when the opening cover 610 is opened, and may be electrically connected to the connection terminal 410 when the opening cover 610 is coupled to the housing cover 600. In the case where the opening cover 610 is coupled to the housing cover 600, the connection terminal 410 may be connected to the connection pin 614 in an internal space of the body portion 615 of the interlock switch 616.

For example, portions of both the connection terminal 410 and the connection pin 614 may abut each other within the body portion 615 of the interlock switch 616 when the opening cover 610 is closed. When the opening cover 610 is opened, the connection terminal 410 may be removed from the body portion 615 so that the connection terminal 410 is no longer in an abutting relationship with the connection pin 614. When the connection pin 614 is not longer in the abutting relationship with the connection terminal 410, the fuse 400 may be disconnected and the power of the battery pack 700 may be disconnected.

Accordingly, the interlock switch 616 may be formed on the inner surface of the opening cover 610 so that the power of the battery pack 700 is disconnected or connected according to the opening/closing of the opening cover 610. The grip portion 611 may be formed on the outer surface of the opening cover 610, and may be formed at the position vertical to the interlock switch 616. Accordingly, when the opening cover 610 is opened or fastened to the housing cover 600, the interlock switch 616 may be exactly disconnected or connected. The grip portion 611 may be formed at the position vertical to the interlock switch 616 so as to simplify fastening the opening cover 610 to the housing cover 600 at the exact position, and thereby to reduce the possibility of damaging the interlock switch 616 when opening and closing the opening cover 610.

The mounting portion 630 may be formed along the circumference of the opening 520 so that the opening cover 610 is mounted on the opening 520 of the housing cover 600. An edge portion of the opening cover 610 is positioned and mounted on the mounting portion 630. In this case, the first hole 510 (See FIG. 3) is formed in the mounting portion 630 of the housing cover 600, and the second hole 613 corresponding to the first hole 510 is formed in the opening cover 610. The first hole 510 may include a plurality of first holes 510, e.g., may include two first holes 510 formed at opposing sides of the opening cover 610. The second hole 613 may include a plurality of second holes 613, e.g., may include two second holes 613 formed at opposing sides of the opening cover 610. Accordingly, the fastening members 612 pass through the corresponding ones of the plurality of first and second holes 510 and 613, so that the opening cover 610 may be fastened to the mounting portion 630 of the housing cover 600.

Figure 3:
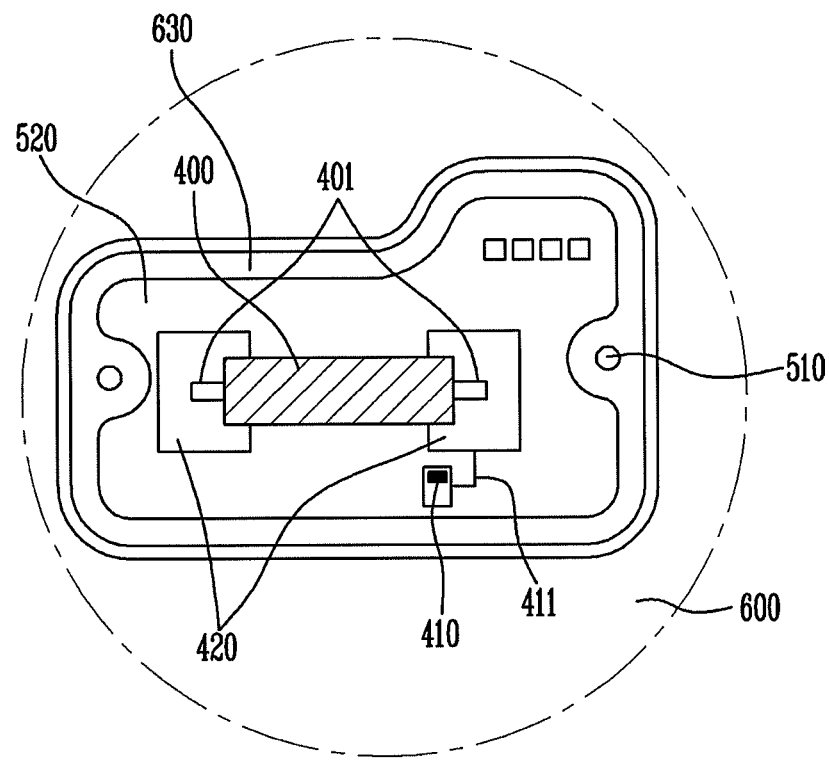
FIG. 3 illustrates a plan view of a state in which the opening cover of the battery pack is opened according to an exemplary embodiment.

FIG. 3 is a plan view showing a state in which the opening cover 610 of the battery pack is opened according to an exemplary embodiment.

Referring to FIG. 3, the fuse 400 and bus-bars 420 connected to the fuse 400 may be positioned in the inside of the housing 500 (see FIG. 1) below the opening 520. FIG. 3 illustrates a state in which the opening cover 610 (see FIG. 2) is opened so that the fuse 400 and the bus-bars 420 are exposed. The bus-bar 420 may output an input control signal or power. Fuse terminals 401 at opposing ends of the fuse 400 may be connected to the respective bus-bars 420. The bus-bar 420 may be connected to the connection terminal 410 positioned at one side of the fuse 400 through a connection member 411.

The interlock switch 616 positioned vertical to the grip portion 611 (see FIG. 2) of the opening cover 610 may cut off current flowing in the fuse 400 according to when the opening cover 610 is opened for the purpose of checking or replacing the fuse 400. The interlock switch 616 includes the insulative body portion 615 (see FIG. 2) and the connection pin 614 (See FIG. 2) positioned in the body portion 615. When the opening cover 610 is coupled to the housing cover 600, the connection terminal 410 may come in contact with the connection pin 614 in the inside of the body portion 615 so that the fuse 400 is not cut off (e.g., so that the fuse 400 is in a connected state). When the opening cover 610 is opened, the connection pin 614 of the interlock switch 614 may be separated from the connection terminal 410 of the bus-bar 410, so that the current flowing in the fuse 400 is cut off (e.g., so that the fuse 400 is in a non-connected state). Thus, the fuse 400 may be safely separated from the battery pack 700 when the fuse 400 is cut off.

According to an exemplary embodiment, when the interlock switch 616 and the grip portion 611 are formed vertical to each other on the top and bottom surfaces of the opening cover 610, i.e., on the outer and inner surfaces of the housing cover 600, the interlock switch 616 may easily control the current flowing in the fuse 400 when the opening cover 610 is opened/closed. Accordingly, the interlock switch 616 may be correctly mounted or removed according to the opening/closing of the opening cover 610, so that it may be possible to prevent damage of the interlock switch 616 and to exactly operate the interlock switch 616.

Figure 4:
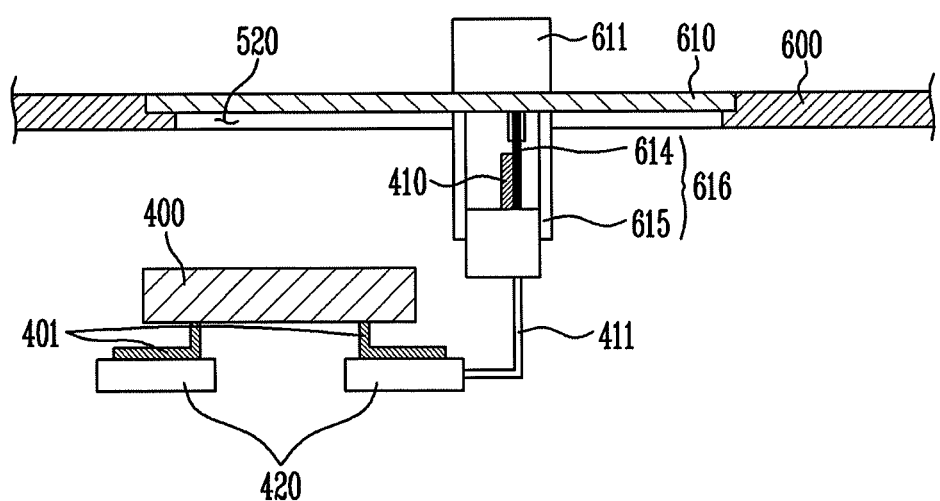
FIG. 4 illustrates a sectional view of a state in which an opening cover is closed according to an exemplary embodiment.
Figure 5:
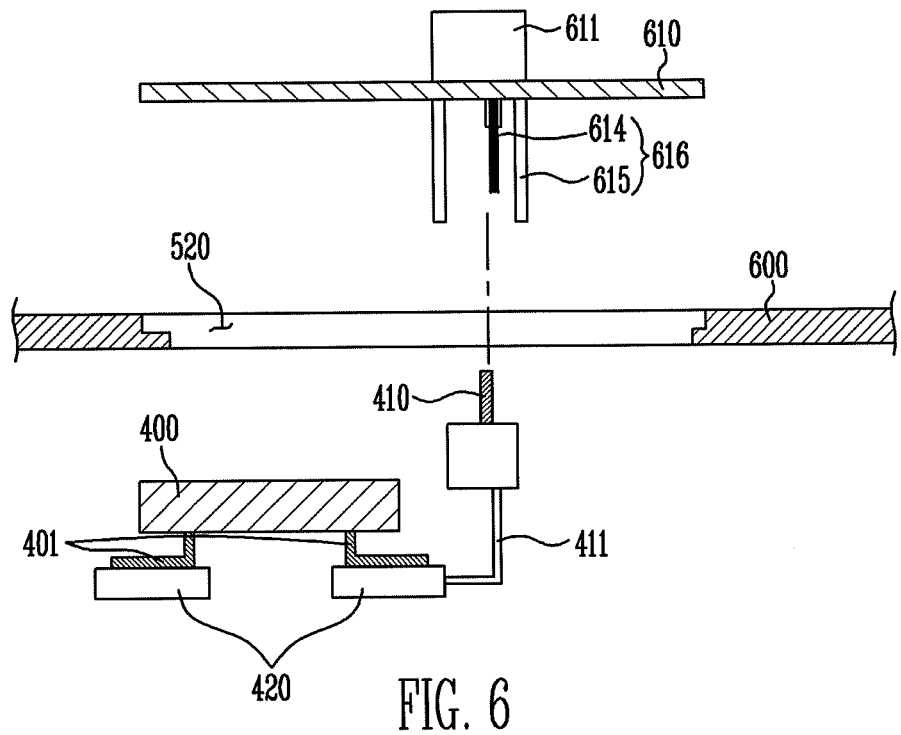
FIG. 5 illustrates a sectional view of a state in which an opening cover is opened according to an exemplary embodiment.

FIG. 4 is a sectional view taken of the opening cover 610 in a closed state. FIG. 5 is a sectional view of the opening cover 610 in an opened state.

Referring to FIGS. 4 and 5, the grip portion 611 is formed on the outer surface of the opening cover 610 mounted to the opening 520 of the housing cover 600, and the opening cover 610 is mounted so as to be able to expose or cover the opening 520. The opening cover 610 may be seated within a stepped structure surrounding the opening 520 so that an upper surface of the opening cover 610 is horizontally aligned with an upper surface of the housing cover 600. The interlock switch 616 may be formed on the inner surface of the opening cover 610 positioned vertical to the grip portion 611.

The interlock switch 616 formed on the inner surface of the opening cover 610 may cut off the current flowing in the fuse 400 according to whether the opening cover 610 is opened or closed. The interlock switch 616 may have the at least one connection pin 614, and the at least one connection terminal 410 corresponding to the connection pin 614, that are connected to the fuse 400. Therefore, the connection terminal 410 may be separated from the connection pin 614 when the opening cover 610 is opened, and may be connected to the connection pin 614 when the opening cover 610 is coupled to the housing cover 600. The interlock switch 616 may further include the body portion 615 surrounding the sides of the connection pin 614 at the predetermined interval with the connection pin 614 in the inside of the interlock switch 616. Accordingly, when the opening cover 610 is coupled to the housing cover 600, the connection terminal 410 is connected to the connection pin 614 in an internal space of the body portion 615 of the interlock switch 616.

As described above, the power of the battery pack 700 may be disconnected or connected according to the opening/closing of the opening cover 610, and the grip portion 611 and the interlock switch 616 may be formed vertical to each other on the outer and inner surfaces of the opening cover 610, respectively. Accordingly, the interlock switch 616 may be operated in the process of separating the opening cover 610 from the housing cover 600 so that the current flowing in the fuse 400 may be cut off. Thus, it may be possible to safely check the disconnection of the fuse 400 or replace the fuse 400 in a high-voltage environment such as an electric vehicle or hybrid electric vehicle. The grip portion 611 and the interlock switch 616 may be formed vertical to each other so that the connection pin 614 may be inserted at the exact position when the opening cover 610 is opened or coupled to the housing cover 600, thereby improving the operability of the interlock switch 616.

Figure 6:
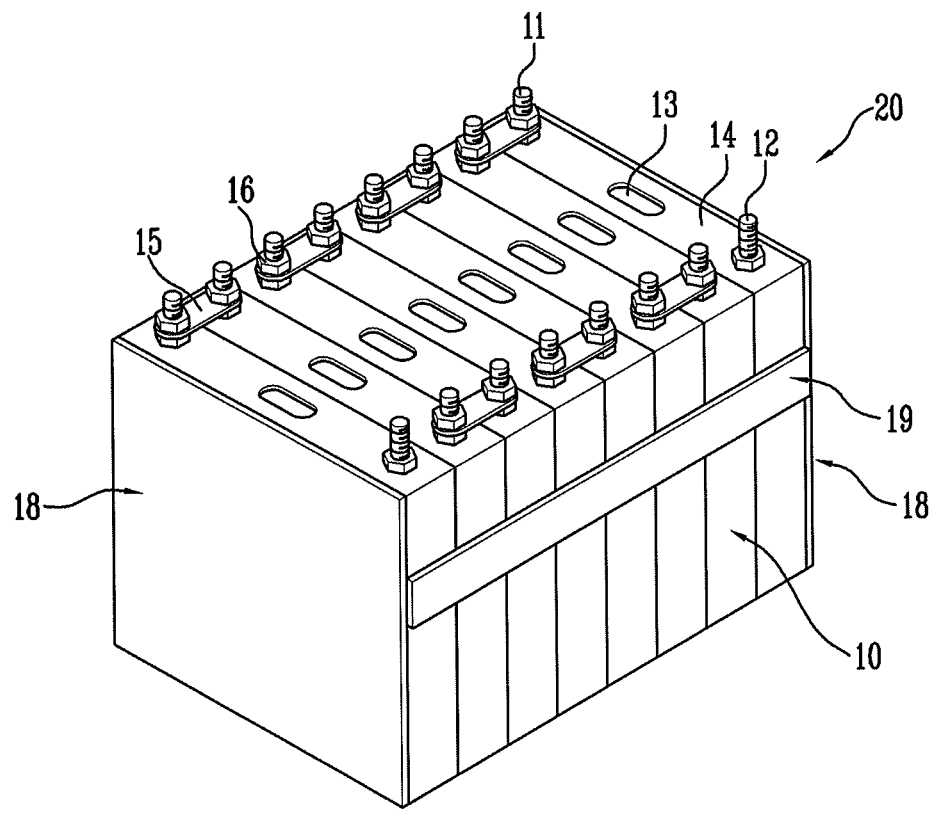
FIG. 6 illustrates a perspective view showing a battery module according to an exemplary embodiment.

FIG. 6 is a perspective view showing a battery module that may be inserted into the housing 500 and covered with the housing cover 600, according to an exemplary embodiment.

Referring to FIG. 6, the battery module 20, according to this embodiment, may be used as one set having a plurality of battery units 20 connected to one another so as to obtain high power. Each of the battery modules 20 may be formed by arranging a plurality of battery cells 10 in one direction. The battery cells 10 may be electrically connected to one another. The battery cell 10 may include a battery case of which one surface is opened, and an electrode assembly and an electrolyte that are accommodated within the battery case.

The electrode assembly and the electrolyte generate electrochemical energy through an electrochemical reaction therebetween, and the battery case may be sealed by a cap plate 14. The cap plate 14 may be provided with terminal portions 11 and 12 and a vent portion 13. The terminal portions 11 and 12 may be composed of positive and negative electrode terminals 11 and 12 having different polarities from each other. The vent portion 13 is a safety means of the battery cell 10, and acts as a passage through which gas generated in the inside of the battery cell 10 may be exhausted to the outside of the battery cell 10. The positive and negative electrode terminals 11 and 12 of neighboring battery cells 10 may be electrically connected to each other by a bus-bar 15. The bus-bar 15 may be fixed to the positive and negative electrode terminals 11 and 12 using a fastening member 16 such as a nut.

The battery module 20 includes the plurality of battery cells 10 arranged therein and one or more plates 18 and 19 may be used to fix the arrangement state of the battery cells 10. The plates 18 and 19 may include a pair of end plates 18 provided opposite to each other so as to face wide surfaces of the battery cells 10, and a side plate 19 connected to the end plates 18 so as to be adjacent to side surfaces of the battery cells 10. The plates 18 and 19 may be used to fix the plurality of battery cells 10, and may be variously modified according to the design of the battery module By way of summation and review, a battery pack may include at least one battery module arranged within a single housing. Each of the battery modules may include a plurality of battery cells connected to each other. Accordingly, the battery pack, via the battery cells of the battery modules, may be used as a large capacity battery.

Embodiments relate to a battery pack capable of easily connecting or disconnecting power by opening or closing an opening cover. For example, the battery pack includes a grip portion formed on the outer surface of the opening cover, and formed vertical to a connection pin formed on the inner surface of the opening cover, so that the connection pin may be inserted at a specific position, e.g., an exact position, when the opening cover is opened or closed. Further, by the connection pin being inserted at the specified position when the opening cover is opened or coupled to the housing cover, damage of the connection pin may be minimized and/or prevented. Accordingly, the power of the battery pack may be easily disconnected or connected by opening or closing the opening cover.

Embodiments also relate to a battery pack in which, when an opening cover is opened, power is simultaneously disconnected so that when various types of components in the battery pack are replaced, the components may be easily and safely replaced without an accidental electrical shock.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
a housing having an opened top, the housing accommodating at least one battery module and a fuse therein;
a housing cover that covers the opened top of the housing, the housing cover including an opening therein that corresponds to a region of the housing that accommodates the fuse; and
an opening cover mountable to the opening of the housing cover, a state of the opening cover being changeable between an opened state and a closed state;
the opening cover including an interlock switch on an inner surface of the opening cover and a grip portion on an outer surface of the opening cover, the grip portion being arranged along a vertical direction with respect to the interlock switch, wherein:
the interlock switch has at least one connection pin, and at least one connection terminal is connected to the fuse, the connection terminal corresponding to the connection pin, and the interlock switch includes a body portion that surrounds sides of the connection pin at a predetermined distance from the connection pin,
a distance from the inner surface of the opening cover to a distal end of the body portion in the vertical direction is greater than a distance from the inner surface of the opening cover to a distal end of the connection pin in the vertical direction such that the connection pin is seated within the body portion,
when the opening cover is in the closed state, the connection terminal is connected to the connection pin in an internal space of the body portion of the interlock switch, and
when the opening cover is in the opened state, the fuse in the housing is exposed through the opening and electrically isolated from a power supply.

2. The battery pack as claimed in claim 1, wherein the interlock switch is configured to cut off a current flowing in the fuse according to the state of the opening cover.

3. The battery pack as claimed in claim 1, wherein the interlock switch is configured to cut off a current flowing in the fuse when the opening cover is in the opened state.

4. The battery pack as claimed in claim 3, wherein the interlock switch is configured to restore the current flowing in the fuse when the state of the opening cover changes from the opened state to the closed state.

5. The battery pack as claimed in claim 1, wherein when the opening cover is in the opened state, the connection terminal is separated from the connection pin.

6. The battery pack as claimed in claim 1, wherein the body portion is formed of an insulating material.

7. The battery pack as claimed in claim 1, wherein the grip portion is vertically aligned with the body portion of the interlock switch.

8. The battery pack as claimed in claim 1, wherein the housing cover includes a mounting portion extending along a perimeter of the opening, the mounting portion having the opening cover mounted thereon.

9. The battery pack as claimed in claim 8, wherein:
the mounting portion of the housing cover includes a first hole extending therethrough, the opening cover includes a second hole corresponding to the first hole extending therethrough, and
the first hole and the second hole are fastened by a fastening member.

10. The battery pack as claimed in claim 8, wherein the opening cover is seated directly on the mounting portion.

11. The battery pack as claimed in claim 1, wherein the interlock switch is configured to electrically isolate the fuse from the power supply simultaneously with changing the state of the opening cover from the closed state to the opened state.

12. The battery pack as claimed in claim 1, wherein:
the connection terminal includes a base and blade, and
in the closed state, inner surfaces of the body portion contact outermost surfaces of the connection terminal.

* * * * *